April 30, 1940.　　　M. M. SAFFORD　　　2,199,209
EXTRUSION DEVICE
Filed May 26, 1937
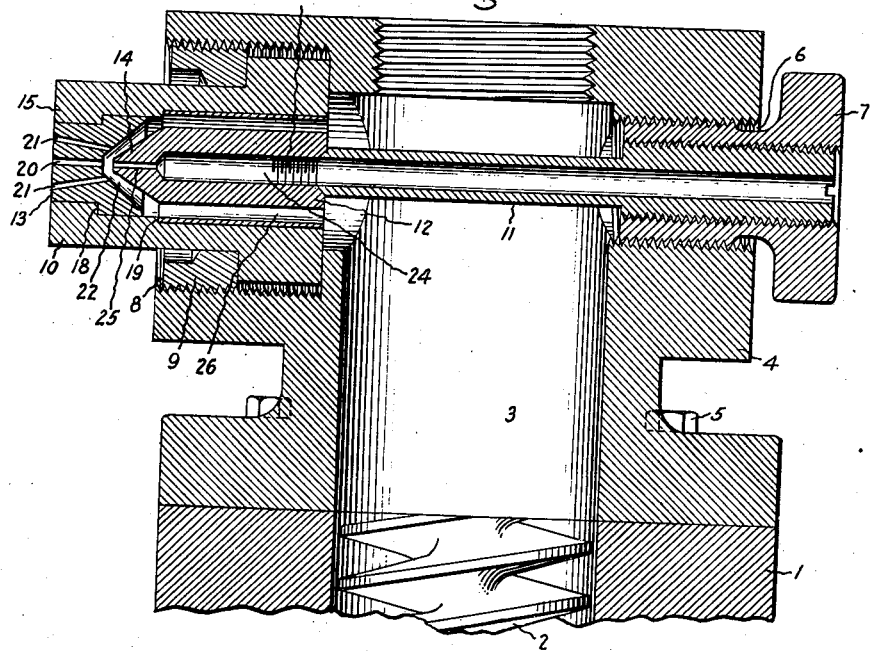
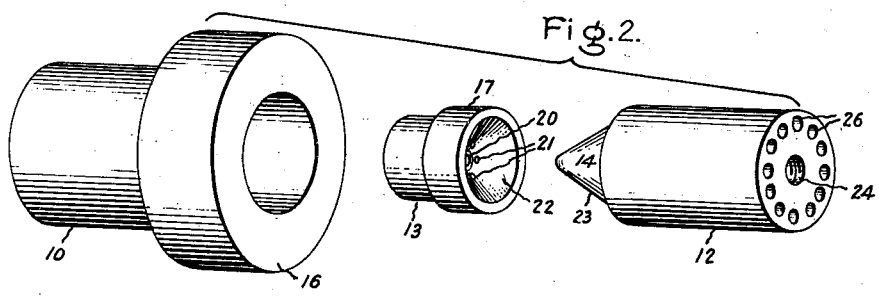
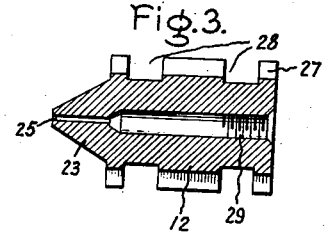
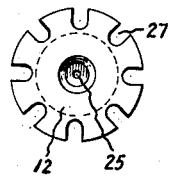
Inventor:
Moyer M. Safford,
by Harry E. Dunham
His Attorney.

UNITED STATES PATENT OFFICE 2,199,209

EXTRUSION DEVICE

Moyer M. Safford, Schenectady, N. Y., assignor to General Electric Company, a corporation of New York Application May 26, 1937, Serial No. 144,888

4 Claims. (Cl. 18—13)

The present invention relates to an extrusion device and more particularly to an extrusion die useful for covering electrical conductors with plastic insulating material.

A principal object of the invention is to provide a simply constructed device having a die which will accurately extrude very thin or thick walls of insulation, automatically centering the insulation with respect to the conductor being insulated.

Other and further objects of the invention will be apparent as the description thereof proceeds.

In the accompanying drawing forming a part of this application;

Fig. 1 is a view in elevation of the complete assembly;

Fig. 2 is a view in perspective showing the shell, die and leader parts of the assembly in spaced relation;

Fig. 3 is a sectional view of a modified construction of leader; and

Fig. 4 is an end view of the construction shown in Fig. 3.

Referring to Fig. 1 of the drawing a conventional extruding or tubing machine 1 is provided with a worm 2 for forcing plastic insulating material into a chamber 3 of a head 4 which is suitably secured to the extrusion machine as by the bolts 5 shown in this figure of the drawing.

At one side of chamber 3 there is an opening 6 in which is fitted a guide holder 7. At the opposite side of the chamber 3 there is an opening 8 into which is fitted a threaded sleeve 9, the inner end of which bears against the collar portion of shell 10, holding it in position against the inner wall of the opening 8. One end of a tubular sleeve 11 is held within the guide holder 7, the other end of the sleeve being conically fitted into the back end of a leader 12. A die 13 is accurately fitted within shell 10 being retained by machine fit between the nozzle portion 14 of the leader and the exposed end 15 of the shell 10.

As will be observed more particularly from Fig. 2 the shell 10 is a cylinder provided with an outer collar or flange 16. As shown in Fig. 1, the inner surface of the shell 10 is machined to receive both leader 12 and die 13. Die 13 is provided with an outer flange or collar 17 which abuts an inner flanged surface 18 of the shell and leader 12 likewise is positioned within shell 10 against a flanged surface or shoulder 19. The assembly of die 13 and leader 12 is thus accurately maintained within the shell 10. The machined inner surfaces of shell 10 are ground very accurately to size and because of the relatively large bearing surfaces practically no inaccuracy of alignment exists between leader 12 and die 13.

The die 13 is preferably made of hardened steel. The central opening 20 determines the outside diameter of the extruded covering. As will be observed from Figs. 1 and 2, a plurality of smaller holes 21 are provided in the die 13 and lead back at an angle to the conical surface 22 of the die. The holes 21 converge inwardly toward the conical tip of leader 12 so that when the excess plastic material is extruded therethrough it will not face on the covered wire emerging through opening 20 and cause unevenness of the coating. These holes assure a fresh supply of stock at all times during the extrusion process since they provide for overflow of material and prevent accumulation of dead stock. The accumulation of dead stock at this point would eventually cure and occasionally come through on the wire making the surfaces very rough and uneven. While I have shown this die 13 made as a separate unit from shell 10 it is possible to make the die and shell integral, i. e., as a single construction.

Leader 12 is, as shown, in the form of a cylindrical body having a conical tip 14 facing the conical surface 22 of the die. This leader is preferably also made of hardened steel and is machined accurately to fit the shell. A central hole 24 in the leader leads to a smaller hole 25 which is in alignment with hole 20 in the die. Concentric with hole 24 and adjacent the outer surface of the cylindrical portion of the leader are a series of holes 26 drilled parallel with the axis of the leader. These holes offer sufficient resistance to the flow of stock so that the pressure is equalized and a smooth even flow of the material being extruded is obtained at the die at all times.

As shown in Figs. 3 and 4 the leader may be modified to the extent that the concentric holes are enlarged to open out to the surface of the cylindrical portion of the leader, the openings being designated by the numeral 27. As indicated in Fig. 3 the openings 27 need not be continuous throughout the length of the leader 12, but may be discontinuous providing relatively larger spaces as at 28. This modified form of leader is advantageously used if it is found necessary to employ a large quantity of stock or a stock which is apt to offer greater resistance to flow. This modified form of leader thus assures of even greater uniformity of flow. As indicated at 29 the leader is provided with a threaded portion to permit of easy removal from the shell by a wheel-pulling device.

The operation of the apparatus will be apparent from the foregoing description. When a conductor or wire is to be insulated it is fed from a pay off device (not shown) through the hollow sleeve 11 in the guide holder 7, into the leader 12 through holes 24 and 25, then through hole 20 out and on to a take-up device (not shown). The flow of stock is maintained by worm 2, into chamber 3 through holes 26 (or 27) past the conical tip 25 and into hole 20 where it is extruded over the conductor or wire being fed through the same opening in the die.

It will be apparent from the foregoing that the device is simple in construction, the die assembly being so constructed as to take care of unevenness in flow of stock, insure alignment between leader and die, and assure the supply of fresh stock at the point of the die where the conductor or wire is being covered.

Various plastic materials may be extruded with the apparatus. It is particularly applicable to the extrusion of uniform thin coverings of plastic materials on bare or previously covered conductors or wires.

What I claim as new and desire to secure by Letters Patent of the United States is:

1. In an extrusion device for extruding plastic material on wire, in combination a shell, a leader and a die, said leader and die being wholly within and accurately aligned in said shell, a conical tip on said leader fitted within but not contacting a conical surface in said die to form a passage for plastic material fed through said leader to said die, said die and leader having accurately aligned central openings to receive a wire passed therethrough, said leader having a plurality of longitudinal holes adjacent the outer surface thereof, said die having a plurality of longitudinal holes surrounding the central opening therein and leading from the outer end surface of the die convergently toward the central opening at the tip of the conical surface of said leader.

2. An extrusion device comprising a die provided with a central opening for extruding plastic material on a conductor, said die being provided with a plurality of longitudinal convergent holes therethrough surrounding said central opening for equalizing the flow of plastic material through said central opening, said longitudinal holes converging toward the conductor entrance end of the die.

3. In an extrusion device for extruding plastic material on a wire, the combination of a shell, a leader and die, said leader and die being contained wholly within said shell, means for maintaining said leader and die in accurate alignment within said shell, a plurality of holes formed in said leader for feeding plastic material uniformly to the die, said die having a central hole therethrough for receiving plastic material fed from said leader, said die being also provided with means entirely within said die for causing uniform flow of said plastic material on the wire fed through said central hole, said means consisting of a plurality of holes converging toward the entrance end of said die.

4. In combination a shell, a leader and die wholly within said shell, said leader and die having central openings accurately aligned within said shell, a plurality of longitudinal holes in said leader adjacent the outer edge thereof and concentric with the central opening therein and a plurality of longitudinal holes in said die converging toward the entrance end of said die and communicating with the holes in the leader.

MOYER M. SAFFORD.